(12) United States Patent
Kyung et al.

(10) Patent No.: US 10,021,282 B2
(45) Date of Patent: Jul. 10, 2018

(54) MULTI-APERTURE CAMERA SYSTEM USING DISPARITY

(71) Applicant: CENTER FOR INTEGRATED SMART SENSORS FOUNDATION, Daejeon (KR)

(72) Inventors: Chong Min Kyung, Daejeon (KR); Jun Ho Mun, Suwon-si (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 0 days.

(21) Appl. No.: 15/355,671

(22) Filed: Nov. 18, 2016

(65) Prior Publication Data
US 2017/0150019 A1 May 25, 2017

(30) Foreign Application Priority Data

Nov. 23, 2015 (KR) .......................... 10-2015-0164214
Feb. 1, 2016 (KR) .......................... 10-2016-0012382

(51) Int. Cl.
*H04N 5/225* (2006.01)
*G03B 9/02* (2006.01)
(Continued)

(52) U.S. Cl.
CPC .............. *H04N 5/2254* (2013.01); *G03B 9/02* (2013.01); *G03B 11/00* (2013.01); *G03B 13/36* (2013.01);
(Continued)

(58) Field of Classification Search
CPC .......... G03B 11/00; G03B 13/36; G03B 9/02; H04N 5/2226; H04N 5/2253; H04N 5/2254; H04N 5/23212; H04N 5/332; H04N 9/04
See application file for complete search history.

(56) References Cited

U.S. PATENT DOCUMENTS

2012/0105594 A1* 5/2012 You ........................ G01S 7/4811
348/49
2013/0033579 A1* 2/2013 Wajs ....................... G02B 7/365
348/46

(Continued)

FOREIGN PATENT DOCUMENTS

| JP | 2007033652 A | 2/2007 |
| JP | 2014153494 A | 8/2014 |
| KR | 101566619 B1 | 11/2015 |

*Primary Examiner* — Amy Hsu
(74) *Attorney, Agent, or Firm* — Schmeiser, Olsen & Watts LLP

(57) ABSTRACT

A multi-aperture camera system includes a first aperture introducing an RGB optical signal, a second aperture distinguished from the first aperture and introducing an optical signal, which is different from the RGB optical signal in wavelength, an image sensor processing the RGB optical signal, which is introduced through the first aperture, and obtaining a first image to an object and configured to process an optical signal, which is introduced through the second aperture and is different from the RGB optical signal in wavelength, and obtaining a second image for the object, and a distance determining part using a disparity between the first image and the second image and determining a distance between the image sensor and the object. The first aperture and the second aperture are formed on a unitary optical system to have different centers each other.

16 Claims, 11 Drawing Sheets

(51) Int. Cl.

| | |
|---|---|
| *H04N 5/232* | (2006.01) |
| *H04N 9/04* | (2006.01) |
| *H04N 5/222* | (2006.01) |
| *H04N 5/33* | (2006.01) |
| *G03B 11/00* | (2006.01) |
| *G03B 13/36* | (2006.01) |

(52) U.S. Cl.
CPC ......... *H04N 5/2226* (2013.01); *H04N 5/2253* (2013.01); *H04N 5/23212* (2013.01); *H04N 5/332* (2013.01); *H04N 9/04* (2013.01); *H04N 9/045* (2013.01)

(56) References Cited

U.S. PATENT DOCUMENTS

| | | | |
|---|---|---|---|
| 2016/0042522 A1* | 2/2016 | Wajs | H04N 5/2254 348/335 |
| 2016/0255323 A1* | 9/2016 | Wajs | G06T 7/60 348/49 |
| 2016/0349042 A1* | 12/2016 | Hsin | G01B 11/22 |
| 2017/0140221 A1* | 5/2017 | Ollila | G06K 9/00604 |

* cited by examiner

MULTI-APERTURE CAMERA SYSTEM USING DISPARITY

CROSS-REFERENCE TO RELATED APPLICATION(S)

This application claims the benefit under 35 U.S.C. § 119(a) of a Korean patent application No. 10-2015-0164214 filed Nov. 23, 2015 in the Korean Intellectual Property Office, a Korean patent application No. 10-2016-0012382 filed on Feb. 1, 2016 in the Korean Intellectual Property Office, the entire disclosure of which are hereby incorporated by reference.

TECHNICAL FIELD

The present disclosure relates to a multi-aperture camera system using a disparity and more particularly, to technology for determining a distance between an object and an image sensor included in a multi-aperture camera system using a disparity between images which are obtained through a plurality of apertures.

BACKGROUND

Depth-From-Defocus (DFD) technology determining a distance between an object and an image sensor operates to estimate a distance between the object and the image sensor using a blur size at each of images obtained through a plurality of apertures. However, such general DFD technology is insufficient to exactly calculate a distance between an image sensor and an object because the distance between the image sensor and the object is estimated based on a blurring rate after blurring images and equalizing blur sizes of the images.

For that reason, there has been proposed technology of using a disparity between images obtained through a plurality of apertures in order to determine a distance between an image sensor and an object. In detail, such disparity-based technology operates with two optical systems each including apertures and image sensors, and determines a distance between the image sensor and an object by using a disparity between images obtained by the images sensors through apertures respective to the two optical systems.

With the disparity-based technology requiring two optical systems, it may be inadequate for a scaling-down camera module and may be costly in fabrication.

Therefore, the following embodiments for determining a distance between an image sensor and an object are proposed to solve the aforementioned disadvantages and problems involved in the DFD technology and the disparity-based technology.

SUMMARY

Aspects of the present disclosure are to address at least the above-mentioned problems and/or disadvantages involved in the DFD technology and the disparity-based technology and to provide at least the advantages described below. Accordingly, embodiments of the present disclosure are to provide a multi-aperture camera system, and an operating method thereof, for determining a distance between an object and an image sensor, using a plurality of apertures which are formed on a unitary optical system and are offset in at least one of horizontal, vertical or oblique directions of the image sensor to have different centers each other.

Additionally, embodiments of the present disclosure are to provide a multi-aperture camera system, and an operating method thereof, capable of securing the quality of an RGB image obtained by an image sensor, using a first aperture for guiding an RGB optical signal and a second aperture for guiding an optical signal having a wavelength different from the RGB optical signal, to a plurality of apertures which are formed on a unitary optical system and are offset in at least one of horizontal, vertical or oblique directions of the image sensor to have different centers each other.

Additionally, embodiments of the present disclosure are to provide a camera system, and an operating method thereof, in a smaller size and cost than a stereo camera by estimating a distance between a camera and an object through the camera including at least two apertures for the same optical system or optical lens.

Additionally, embodiment of the present disclosure are to provide a camera system, and an operating method thereof, capable of solving problems caused from calibration errors, without a calibration process required in a stereo camera, by employing a camera including at least two cameras for the same optical systems or optical lens.

Additionally, embodiments of the present disclosure are to provide a camera system, and an operating method thereof, capable of obtaining a high-quality RGB image with low complexity even without an additional image signal processing process by guiding an RGB optical signal through a first aperture without damage.

Additionally, embodiments of the present disclosure are to provide a camera system, and an operating method thereof, capable of greatly improving the complexity of computation and hardware structure by facilitating a scan-line processing technique to be applied to distance estimation through alignment of first and second apertures.

In detail, embodiments of the present disclosure are to provide a multi-aperture camera system, and an operating method thereof, capable of searching a plurality of target regions for an object from a second image which is obtained through a second aperture by a searching range based on a source region for the object in a first image which is obtained through a first aperture, selecting one of the plurality of target regions by calculating correlation between the plurality of target object regions and the source region, and determining an interval between an image sensor and the object by using a disparity between the selected one of the target regions and the source region.

Additionally, in searching a plurality of target regions, embodiments of the present disclosure are to provide a multi-aperture camera system, and an operating method thereof, capable of converting heights and widths of the plurality of target regions and a source region into a plurality of values and searching a plurality of target regions.

Additionally, embodiments of the present disclosure are to provide a multi-aperture camera system, and an operating method thereof, capable of determining a distance between an image sensor and an object by using a disparity of each of a plurality of image sets obtained by shifting an unitary optical system, in which a first aperture and a second aperture are formed, to be disposed at a plurality of relative positions for the image sensor.

In an embodiment, a multi-aperture camera system using a disparity may include a first aperture configured to introduce an RGB optical signal, a second aperture distinguished from the first aperture and configured to introduce an optical signal, which is different from the RGB optical signal in wavelength, an image sensor configured to process the RGB optical signal, which is introduced through the first aperture, and to obtain a first image to an object and configured to process an optical signal, which is introduced through the second aperture and is different from the RGB optical signal in wavelength, and to obtain a second image for the object, and a distance determining part configured to use a disparity between the first image and the second image and to determine a distance between the image sensor and the object. The first aperture and the second aperture may be formed on a unitary optical system and are offset in at least one of horizontal, vertical, or oblique directions of the image sensor to have different centers each other.

The second aperture may introduce an IR optical signal.

The first aperture and the second aperture may be shaped in one of a circle, an oval, a triangle, a tetragon, a polygon, or a combination of them.

The second aperture may be configured in plurality to search a hidden region for the object.

The plurality of the second apertures may introduce optical signals of different wavelengths.

The first aperture may be formed to have the same center with the unitary optical system.

The distance determining part may calculate from the object to the unitary optical system, in which the first aperture and the second aperture are formed, based on a disparity between the first image and the second image, a distance between the center of the first aperture and the center of the second aperture, an object distance focused on the image sensor, and a focal length.

The multi-aperture camera system may further include a selective IR (SIR) filter configured to prevent introduction of an optical signal, which is different from the RGB optical signal in wavelength, into a RGB pixel that is included in the image sensor and processes the RGB optical signal for the first image.

The multi-aperture camera system may further include a dual band filter disposed over the first aperture and the second aperture and configured to selectively introduce one of the RGB optical signal and an optical signal, which is different from the RGB optical signal in wavelength, for preventing introduction of the optical signal, which is different from the RGB optical signal in wavelength, into a RGB pixel that is included in the image sensor and processes the RGB optical signal for the first image.

The first aperture and the second aperture may be independently formed without overlap each other on the unitary optical system.

The first aperture and the second aperture may be partly overlaid each other on the unitary optical system.

The second aperture may be formed in the first aperture.

The distance determination part may search a plurality of object target regions from the second image by a searching range based on a source region for the object in the first image, may select one of the plurality of target regions by calculating a correlation between the source region and each of the plurality of target regions, and may determine a distance between the image sensor and the object by using a disparity between the source region and the selected one of the target regions.

The distance determination part may convert heights and widths of the source region and the plurality target regions into a plurality of values, and may search the plurality of target regions from the second image by the searching range based on the source region.

In an embodiment, an operating method for a multi-aperture camera system using a disparity may include the steps of introducing an RGB optical signal through a first aperture, introducing an optical signal, which is different from the RGB optical signal in wavelength, through a second aperture distinguished from the first aperture, processing the RGB optical signal, which is introduced through the first aperture, and an optical signal, which is introduced through the second aperture and is different from the RGB optical signal in wavelength, by an image sensor and obtaining a first image and a second image for an object, and using a disparity between the first image and the second image and determining a distance between the image sensor and the object. The first aperture and the second aperture may be formed on a unitary optical system and are offset in at least one of horizontal, vertical, or oblique directions of the image sensor to have different centers each other.

According to an embodiment, a multi-aperture camera system using a disparity may include a unitary optical system which is equipped with a first aperture introducing an RGB optical signal and a second aperture introducing an optical signal different from the RGB optical signal in wavelength and which shifts to be disposed at a plurality of positions, an image sensor obtaining a plurality of image sets—each image set including a first image obtained by processing the RGB optical signal which is introduced through the first aperture, and a second image obtained by processing the optical signal different from the RGB optical signal in wavelength—in correspondence with the plurality of positions in response to disposition of the unitary optical system at the plurality of positions, and a distance determination part determining a distance between the image sensor and an object by a disparity of each of the plurality of image sets, wherein the first aperture and the second aperture are formed to have center positions crossing each other on the unitary optical system.

The distance determination part may calculate a correlation of each of the plurality of image sets, and may determine a distance to the image sensor and the object by using a disparity of at least one of the plurality of image sets based on the correlation of the each of the plurality of image sets.

According to embodiments of the present disclosure, to solve disadvantages and problems involved in the DFD technology and the disparity-based technology, it may be allowable to provide a multi-aperture camera system, and an operating method thereof, for determining a distance between an object and an image sensor, using a plurality of apertures which are formed on a unitary optical system and are offset in at least one of horizontal, vertical or oblique directions of the image sensor to have different centers each other.

In detail, according to embodiments of the present disclosure, it may be allowable to provide a multi-aperture camera system, and an operating method thereof, capable of exactly calculating a distance between an object and an image sensor, using a plurality of apertures which are formed on a unitary optical system and are offset in at least one of horizontal, vertical or oblique directions of the image sensor to have different centers each other.

According to embodiments of the present disclosure, it may be allowable to provide a multi-aperture camera system, and an operating method thereof, capable of facilitating application for lower cost and smaller size exactly by determining a distance between an object and an image sensor, using a plurality of apertures which are formed on a unitary optical system and are offset in at least one of horizontal, vertical or oblique directions of the image sensor to have different centers each other.

According to embodiments of the present disclosure, it may be allowable to provide a multi-aperture camera system, and an operating method thereof, capable of securing the quality of an RGB image obtained by an image sensor, using a first aperture for guiding an RGB optical signal and a second aperture for introducing an optical signal, which is different from the RGB optical signal in wavelength, through a plurality of apertures which are formed on a unitary optical system and are offset in at least one of horizontal, vertical or oblique directions of the image sensor to have different centers each other.

According to embodiments of the present disclosure, it may be allowable to fabricate a camera system in a smaller size and cost than a stereo camera by estimating a distance between a camera and an object through the camera including at least two apertures for the same optical system or optical lens.

According to embodiment of the present disclosure, it may be allowable to solve problems caused from calibration errors, without a calibration process required in a stereo camera, by employing a camera including at least two cameras for the same optical systems or optical lens.

According to embodiments of the present disclosure, it may be allowable to obtain a high-quality RGB image with low complexity even without an additional image signal processing process by guiding an RGB optical signal through a first aperture without damage.

According to embodiments of the present disclosure, it may be allowable to greatly improve the complexity of computation and hardware structure by facilitating a scanline processing technique to be applied to distance estimation through alignment of first and second apertures.

In detail, according to embodiments of the present disclosure, it may be allowable to provide a multi-aperture camera system, and an operating method thereof, capable of searching a plurality of target regions for an object from a second image which is obtained through a second aperture by a searching range based on a source region for the object in a first image which is obtained through a first aperture, selecting one of the plurality of target regions by calculating a correlation between the plurality of target object regions and the source region, and determining an interval between an image sensor and the object by using a disparity between the selected one of the target regions and the source region.

Additionally, in searching a plurality of target regions, embodiments of the present disclosure may be allowable to provide a multi-aperture camera system, and an operating method thereof, capable of converting heights and widths of the plurality of target regions and a source region into a plurality of values and searching the plurality of target regions.

Additionally, according to embodiments of the present disclosure, it may be allowable to provide a multi-aperture camera system, and an operating method thereof, capable of determining a distance between an image sensor and an object using a disparity of each of a plurality of image sets obtained by shifting an unitary optical system, in which a first aperture and a second aperture are formed, to be disposed at a plurality of relative positions for the image sensor.

DETAILED DESCRIPTION

Figure 3:
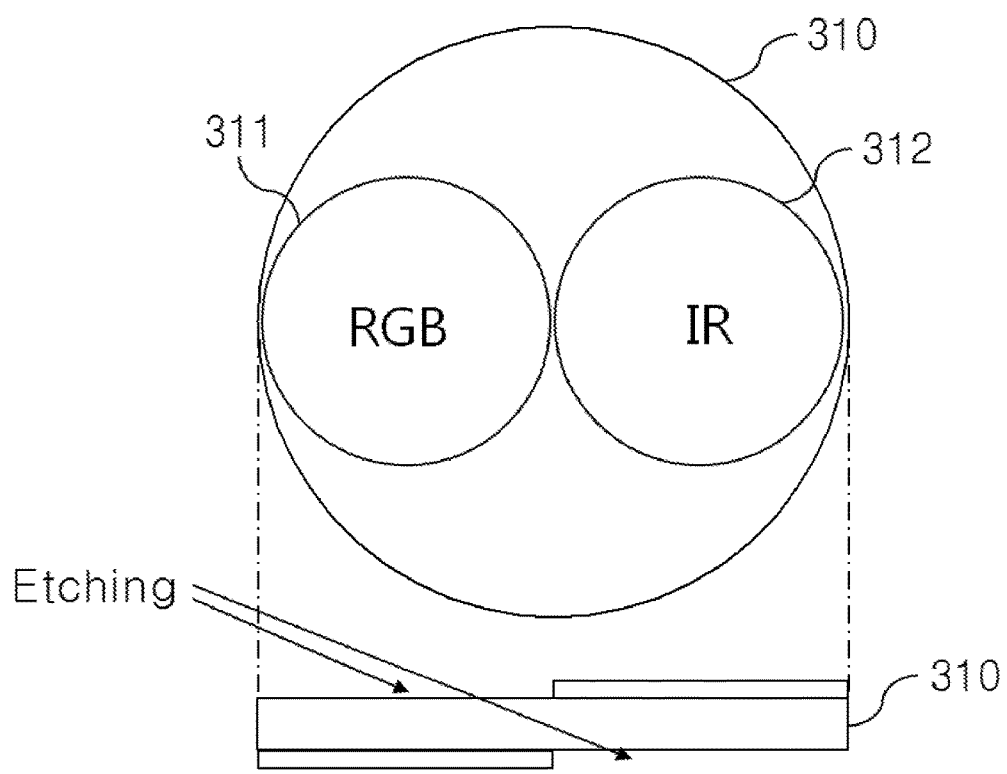
FIG. 3 is a diagram illustrating a first aperture and a second aperture according to an embodiment of the present disclosure.

Hereinafter, various embodiments of the present disclosure will be described in conjunction with the accompanying drawings. Various embodiments described herein, however, may not be intentionally confined in specific embodiments, but should be construed as including diverse modifications, equivalents, and/or alternatives. With respect to the descriptions of the drawings, like reference numerals refer to like elements. FIG. 3 illustrates a first aperture and a second aperture according to an embodiment of the present disclosure.

The terms used in this specification are just used to describe various embodiments of the present disclosure and may not be intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevantly related art and not in an idealized or overly formal detect unless expressly so defined herein in various embodiments of the present disclosure. In some cases, terms even defined in the specification may not be understood as excluding embodiments of the present disclosure.

Figure 1:
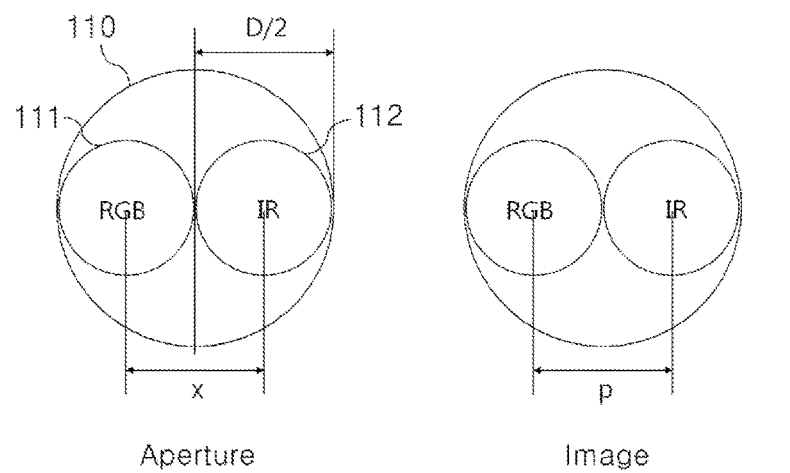
FIG. 1 is a diagram illustrating a scheme of determining a distance between an object and an image sensor using a disparity in a multi-aperture camera system according to an embodiment of the present disclosure.
Figure 1:
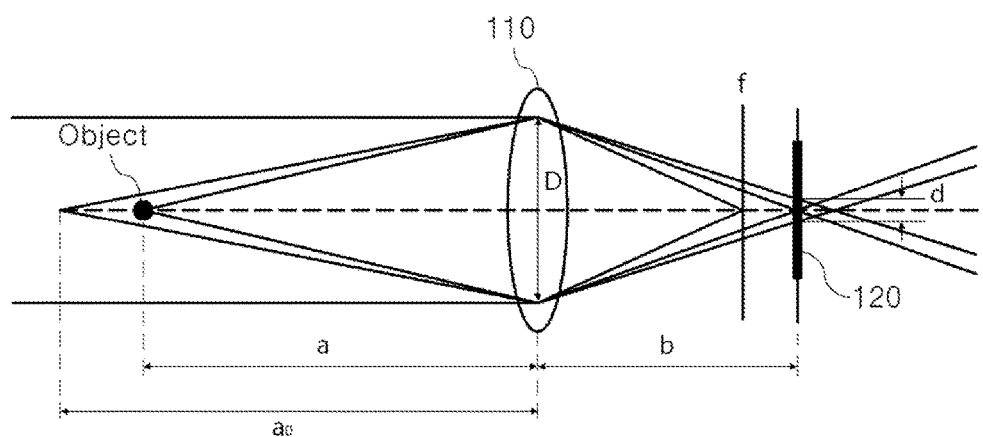

FIG. 1 is a diagram illustrating a scheme of determining a distance between an object and an image sensor using a disparity in a multi-aperture camera system according to an embodiment of the present disclosure.

Referring to FIG. 1, an multi-aperture camera system according to an embodiment of the present disclosure may determine a distance between an object and an image sensor 120 by using a first aperture 111 and a second aperture 112 which are formed on a unitary optical system 110 and are offset in at least one of horizontal, vertical, or oblique directions of the image sensor 120 to have different centers each other. The unitary optical system 110 indicated an optical system including a lens and a filter in which the first aperture 111 and the second aperture 112 are formed.

Hereinafter, a distance between an object and the image sensor 120 will be defined as the distance between the object between a first principal plane (e.g., one of the filter and the lens) of the unitary optical system 110. As described later, in this case, a distance between an object and the image sensor 120 may be calculated by summing up a distance between a first principal plane of the unitary optical system 110 and an object and the first principal plane of the unitary optical system 110 and the image sensor 120 (the distance between the first principal plane of the unitary optical system 110 and the image sensor 120 is preliminarily set in a multi-aperture camera system). Accordingly, determination of a distance between the image sensor 120 and an object may mean determination of a distance between a first principal plane of the unitary optical system 110 and an object.

The first aperture 111 may be formed to introduce an RGB optical signal (e.g., an optical signal with a wavelength of 400 nm to 650 nm) and the second aperture 112 may be formed to introduce an optical signal with a wavelength which is different from that of the RGB optical signal. Although the second aperture 112 is hereinafter described as introducing an IR optical signal (e.g., an optical signal with a wavelength of 650 nm to 819 nm), embodiments of the present disclosure may not be restrictive hereto and various optical signals different from the RGB optical signal in wavelength may be introduced therein.

During this, since the first aperture 111 and the second aperture 112 are formed to have different centers each other, the center of a first image to an object obtained by the image sensor 120 from an RGB optical signal introduced through the first aperture 111 may not agree with the center of a second image to an object obtained by the image sensor 120 from an IR optical signal introduced through the second aperture 112. For example, in the case that the image sensor 120 is disposed close to the unitary optical system 110 from the position shown in the drawing, the center of the second image may incline toward the right side of the center of the first image. In the case that the second image is disposed distant from the unitary optical system 110 from the position shown in the drawing, the center of the second image may incline toward the left side of the center of the first image.

A multi-aperture camera system may use such a mechanism to calculate a disparity p between the first image and the second image as given in Equation 1. Hereinafter, a disparity between a first image and a second image will indicate a distance between the center of the first image and the center of the second image (especially, a distance between the center of an object region of the first image and the center of an object region of the second image).

$$p = \frac{xf}{a_0 - f}\left(\frac{a_0}{a} - 1\right) \quad \text{[Equation 1]}$$

In Equation 1, x denotes a distance between the center of the first aperture 111 and the center of the second aperture 112; f denotes a focal length; a denotes an object distance (a distance from an object to a first principal plane of the unitary optical system 110); and $a_0$ denotes an object distance focused on the image sensor 120.

In the case that the disparity between the center of a first image and the center of a second image, p, changes to a negative value form a positive value or changes to a positive value from a negative value, a disparity direction may be found as changing between the two images. According to a sign of the disparity p, it may be possible to differentiate that an object with an edge is placed in the foreground or in the background on a focus position.

The object distance a may be calculated by Equation 2 using Equation 1.

$$a = \frac{a_0}{1 + \frac{(a_0 - f)}{f} \cdot \frac{p}{x}} \quad \text{[Equation 2]}$$

In Equation 2, $a_0$ denotes an object distance focused on the image sensor 120; f denotes a focal length; p denotes a disparity between a first image and a second image; and x denotes a distance between the center of the first aperture 111 and the center of the second aperture 112.

Accordingly, a distance between the image sensor 120 and an object, c, may be given in Equation 3.

$$c = a + b \quad \text{[Equation 3]}$$

In Equation 3, a denotes an object distance (a distance from an object to a first principal plane of the unitary optical system 110); and b denotes a distance between the first principal plane of the unitary optical system 110 and the image sensor 120.

As described above, a multi-aperture camera system according to an embodiment of the present disclosure may determine a distance between the image sensor 120 and an object by using a disparity between a first image and a second image which are respectively obtained through the first aperture 111 introducing an RGB optical signal and through the second aperture 112 introducing an IR signal. The first aperture 111 and the second aperture 112 are formed on the unitary optical system 110 and are offset in at least one of horizontal, vertical, or oblique directions of the image sensor 120 to have different centers each other.

Especially, by forming the first aperture 111 and the second aperture 112 to be offset in at least one of horizontal, vertical, or oblique directions of the image sensor 120 to have different centers each other, it may be easily available to employ a scan-line processing technique (the scan-line processing technique may be performed by the image sensor 120 in at least one of horizontal, vertical, or oblique directions of the image sensor 120) to determine a distance. For example, the first aperture 111 and the second aperture 112 may be aligned to form agreement between at least one of a horizontal direction (the X-axis direction), a vertical direction (the Y-axis direction), or an oblique direction (a direction slanting to the X-axis and the Y-axis) and a direction of a segment connecting the center of the aperture 111 with the center of the second aperture 112. As an angle between an offset direction of the first aperture 111 and the second aperture 112 and at least one of the horizontal, vertical, or oblique directions of the image sensor 120 is set ideally to 0, a multi-aperture camera system may easily employ a scan-line processing technique. The first aperture 111 and the second aperture 112 may be formed to have their centers which are offset in a direction along which a scan-line processing technique applied to the image sensor 120 is progressing.

Unless an angle between an offset direction of the first aperture 111 and the second aperture 112 and a horizontal direction of the image sensor 120 is set close to 0, a multi-aperture camera system may extend a disparity searching region to employ a scan-line processing technique.

Additionally, a multi-aperture camera system may even calculate a distance between the image sensor 120 and an object by adaptively further using blur sizes respective to a first image and a second image as well as using a disparity between the first image and the second image.

A blur size d for each of a first image and a second image may be given in Equation 4.

$$d = \frac{f^2}{F\#(a_0 - f)}\left|\frac{a_0}{a} - 1\right| \quad \text{[Equation 4]}$$

In Equation 4, f denotes a focal length; F# denotes lens brightness of a multi-aperture camera system; a denotes an object distance (a distance from an object to a first main principal plane of the unitary optical system); and $a_0$ denotes an object distance focused on the image sensor 120.

An object distance may be given in Equation 5 from Equation 4.

$$a = \frac{a_0}{1 + \frac{F\#(a_0 - f)}{f^2}d} \quad (a < a_0) \quad \text{[Equation 5]}$$

$$a = \frac{a_0}{1 - \frac{F\#(a_0 - f)}{f^2}d} \quad (a > a_0)$$

In Equation 5, F# denotes lens brightness of a multi-aperture camera system; $a_0$ denotes an object distance focused on the image sensor 120; f denotes a focal length; and d denotes a blur size at each of a first image and a second image. Accordingly, a multi-aperture camera system may calculate a distance between the image sensor 120 and an object by further using a blur size of each of a first image and a second image as given in Equation 5, as well as using a disparity between the first image and the second image as given in Equation 2.

Figure 2:
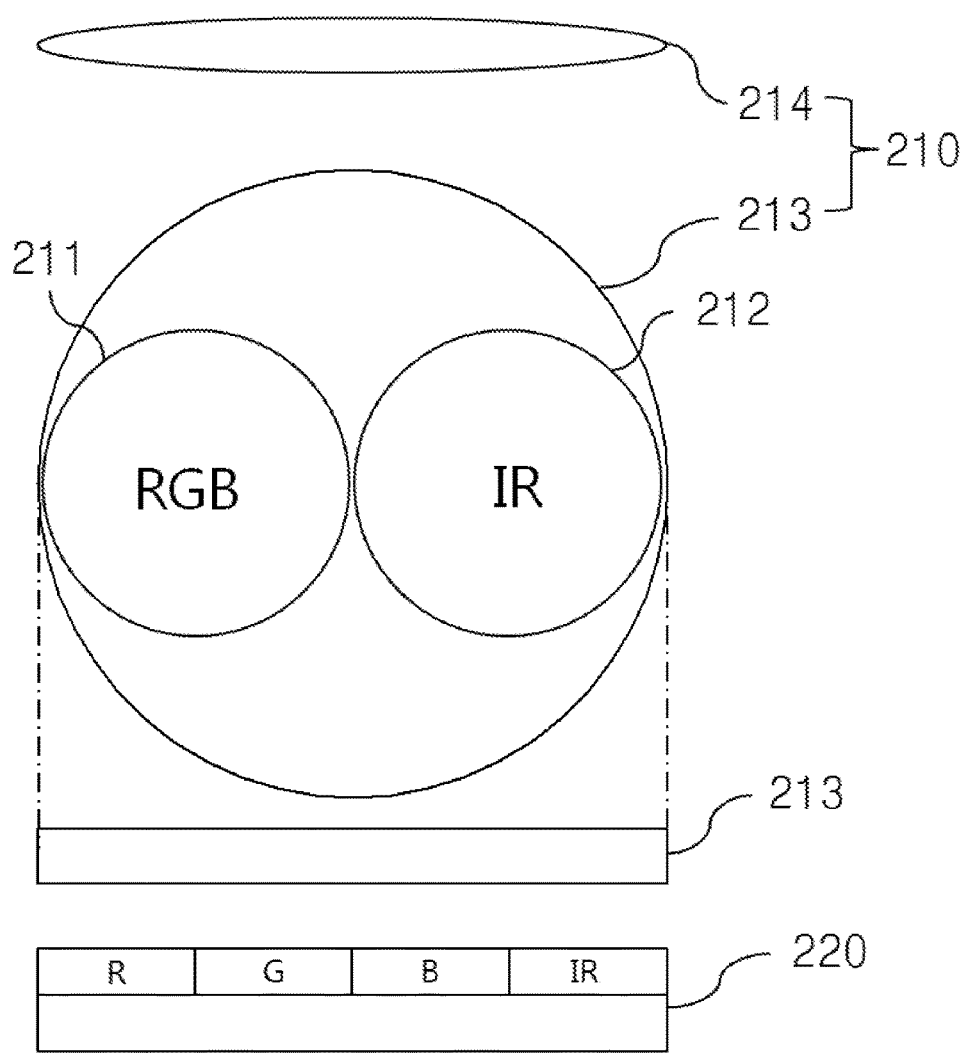
FIG. 2 is a diagram illustrating a multi-aperture camera system according to an embodiment of the present disclosure.

FIG. 2 is a diagram illustrating a multi-aperture camera system according to an embodiment of the present disclosure.

Referring to FIG. 2, a multi-aperture camera system according to an embodiment may include a unitary optical system 210, an image sensor 220, and a distance determining part (not shown). Although the distance determining part will be hereinafter described as being included in the image sensor 220, embodiments of the present disclosure may not be restrictive and the distance determining part may be comprised in an additional component.

On the unitary optical system 210, a first aperture 211 and a second aperture 212 may be formed and offset in at least one of horizontal, vertical, or oblique directions of the image sensor 220 to have different centers each other. In detail, the first aperture 211 and the second aperture 212 may be formed on a filter 213, which is included in the unitary optical system 210, and may be offset in at least one of horizontal, vertical, or oblique directions of the image sensor 220 to have different centers each other (the unitary optical system 210 may include the filter 213 and a lens 214).

Especially, by forming the first aperture 211 and the second aperture 212 to be offset in at least one of horizontal, vertical, or oblique directions of the image sensor 220 to have different centers each other, the first aperture 211 and the second aperture 212 may be aligned to form agreement between at least one of horizontal, vertical, or oblique directions of the image sensor 220 and a direction of a segment connecting the center of the first aperture 211 with the center of the second aperture 212.

Aligning the first aperture 211 and the second aperture 212 to form agreement between at least one of horizontal, vertical, or oblique directions of the image sensor 220 and a direction of a segment connecting the center of the first aperture 211 with the center of the second aperture 212 means that an angle between an offset direction of the first aperture 211 and the second aperture 212 and at least one of horizontal, vertical, or oblique directions of the image sensor 220 is set close to 0. As the distance determining part easily employ a scan-line processing technique for determining a distance (during this, the scan-line processing technique may be performed on at least one of horizontal, vertical, or oblique directions of the image sensor 220), it may be permissible to greatly reduce the complexity of computation and hardware structure.

Therefore, as compared with a stereo camera, a multi-aperture camera system may simplify the two-dimensional or three-dimensional matter comparison with a first image and a second image into the first-dimensional matter. This dimensional simplification may be effective in reducing an amount of computation and the complexity of hardware structure.

Additionally, unless an angle between an offset direction of the first aperture 211 and the second aperture 212 and at least one of horizontal, vertical, or oblique directions of the image sensor 220 is set close to 0, a multi-aperture camera system may extend a disparity searching region for employing a scan-line processing technique.

During this, the first aperture 211 and the second aperture 212 may be same or different each other in diameter. The first aperture 211 and the second aperture 212 may be shaped even in a polygon including circle, oval, triangle, and so on. Additionally, the first aperture 211 and the second aperture 212 may be partly overlaid each other or may not be overlaid each other.

The first aperture 211 may be formed to introduce an RGB optical signal and the second aperture 212 may be formed to introduce an IR optical signal. This configuration will be described later in conjunction with FIG. 3.

The image sensor 220 may include an RGB pixel for obtaining a first image from an object by processing an RGB optical signal which is introduced through the first aperture 211, and may include an IR pixel for obtaining a second image from an object by processing an IP optical signal which is introduced through the second aperture 212.

Based on the mechanism aforementioned with reference to FIG. 1, the distance determining part may use a disparity between a first image and a second image to determine a distance between the image sensor 220 and an object.

In determining a distance between the image sensor 220 and an object, the distance determining part may calculate a correlation between an object region of a first image and an object region of a second image, and then may use and calculate a disparity between the center of the object region of the first image and the center of the object region of the second image in the case that the correlation is equal to or larger than a specific reference. Additionally, the distance determining part may find an object region of a second image, which has a high correlation to an object region of a first image, by searching the object region of the second image in a searching range (a disparity searching range) based on the object region of the first image.

In detail, the distance determination part may search a plurality of target regions for an object from a second image by a searching range based on a source region for the object in a first image, and may calculate a correlation between the source region sand each of the plurality of target regions to select one of the target regions. For example, the distance determination part may search a plurality of target regions corresponding to a source region in a searching range of a second image and, after performing an image pattern matching for each of the plurality of target regions and the source region to calculate a correlation between each of the plurality of target regions and the source region, may select one of the target regions which is most highly correlated with the source region. Accordingly, the distance determination part may use a disparity between a selected one of target regions and a source region to determine a distance between the image sensor 220 and an object.

For more detailed example, the distance determination part may calculate a correlation between a first target region and a source region, a correlation between a second target region and the source region, and a correlation between a third target region and the source region by searching the first target region, the second target region, and the third target region for an object from a second image by a searching range based on the source region. In respectively calculating the correlations, it may be allowable to obtain a disparity between the first target region and the source region, the second target region and the source region, and the third target region and the source region. After then, the distance determination part may select the first target region, which is most highly correlated with the source region, among the first target region, the second target region, and the third target region, and may use the disparity between the selected first target region and the source region to determine a distance between the image sensor 220 and an object.

During this, it may be allowable to convert heights and widths of the source region and the plurality of target regions into a plurality values. In this case, the distance determination part may perform the process, which searches plurality of target regions from a second image by a searching range based on a source region for an object in a first image, by converting heights and widths of the plurality of target regions and the source region into a plurality of values.

Accordingly, heights and widths respective to a source region and a plurality of target regions may be converted into a plurality of values, one source region and one target region may selected with the highest correlation, and a disparity between the selected source region and target region may be used to determine a distance between the image sensor 220 and an object.

For example, the distance determination part may set heights and widths of a source region and a plurality of target regions on a first value, may search a first target region of the first value, a second target region of the first value, and a third target region of the first value, based on the source region of the first value, and may calculate a correlation between the first target region of the first value and the source region of the first value, a correlation between the second target region of the first value and the source region of the first value, and a correlation between the third target of the first value and the source region of the first value.

Subsequently, the distance determination part may search heights and widths of a source region and a plurality of target regions on a second value, may search a first target region of the second value, a second target region of the second value, and a third target region of the second value, based on the source region of the second value, and may calculate a correlation between the first target region of the second value and the source region of the second value, a correlation between the second target region of the second value and the source region of the second value, and a correlation between the third target of the second value and the source region of the second value.

After then, the distance determination part may select the first target region of the first value and the source region of the first value, which have the highest level, among a correlation between the first target region of the first value and the source region of the first value, a correlation between the second target region of the first value and the source region of the first value, a correlation between the third target region of the first value and the source region of the first value, a correlation between the first target region of the second value and the source region of the second value, a correlation between the second target region of the second value and the source region of the second value, and a correlation between the third target region of the second value and the source region of the second value, and thereby may use a disparity between the selected first target region of the first value and the selected source region of the first value to determine a distance between the image sensor 220 and an object.

As such, by using a disparity between a target region and a source region which are selected according to correlations between source regions of a first image and a plurality of target regions, based on the first aperture 211 and the second aperture 212 which are formed on the unitary optical system 210 and may be offset in at least one of horizontal, vertical, or oblique directions of the image sensor 220 to have different centers each other, a multi-aperture camera system according to an embodiment of the present disclosure may exactly calculate a distance between the image sensor 220 and an object, may be fabricated in a low cost, and may be easily applied to a scaling-down camera module.

During this, the multi-aperture camera system may more accurately calculate a distance between the image sensor 220 and an object by converting heights and widths of a source region and a plurality of target regions and by searching the plurality of target regions corresponding to the source region.

Accordingly, instead of an aperture divisionally introducing an RGB optical signal, a multi-aperture camera system may use the first aperture 211, which entirely introduces an RGB optical signal, to secure the quality of an RGB image (a first image) obtained by the image sensor 220.

Additionally, the distance determination part may use the unitary optical system 210 which shifts to be disposed at a plurality of positions on the image sensor 220 and then may scan a plurality of focal object distances to even determine a distance between an object and the image sensor 220.

In this case, the image sensor 220 may obtain a plurality of image sets corresponding to a plurality of positions in response to disposition of the unitary optical system 210 at the plurality of positions (disposition of the unitary optical system 210 at a relative position on the image sensor 220). Each image set may include a first image obtained processing an RGB optical signal introduced through the first aperture 211, and a second image obtained processing an IR optical signal introduced through the second aperture 212. For example, as the unitary optical system 210 is disposed at a position P1, the image sensor 220 may obtain a P1 image set (P1-RGB image and P1-IR image). As the unitary optical system 210 is disposed at a position P2, the image sensor 220 may obtain a P2 image set (P2-RGB image and P2-IR image). As the unitary optical system 210 is disposed at a position P3, the image sensor 220 may obtain a P3 image set (P3-RGB image and P3-IR image).

Accordingly, the distance determination part may use disparities of a plurality of images sets to determine a distance between the image sensor 220 and an object. In detail, the distance determination part may calculate correlations respective to the plurality of image sets (a correlation between the P1-RGB image and the P1-IR image, a correlation between the P2-RGB and the P2-IR, and a correlation between the P3-RGB image and the P3-IR image), and may determine a distance to an object by using a disparity of at least one of the plurality of image sets based on the correlations of the plurality of image sets.

During this, after calculating the correlations of the plurality of image sets to disparities of the plurality of image sets, the distance determination part may select one from the plurality of image sets, which is most highly correlated therewith, and then may use the selected image set to determine a distance between the image sensor 220 and an object.

For example, the distance determination part may preliminarily generate Table 1 which calculates distances based on ideal disparities at a plurality of positions where the unitary optical system 210 is disposed (the distances are calculated using the disparities based in the mechanism described above in conjunction with FIG. 1). Then, after confirming a specific position, where the unitary optical system 210 is disposed, when the most correlated one of a plurality of image sets is selected and obtained, the distance determination part may determine a distance, which is calculated based on an ideal disparity at the specific position where the unitary optical system 210 is disposed with reference to Table 1, as a distance between the image sensor 220 and an object.

TABLE 1

| Unitary optical system position | Ideal disparity | Distance |
|---|---|---|
| Position 1 | Disparity 1 | Depth 1 |
| Position 2 | Disparity 2 | Depth 2 |
| Position 3 | Disparity 3 | Depth 3 |
| ... | ... | ... |

For another example, the distance determination part may select a P1 image set, which is most highly correlated (which has the smallest disparity), among a plurality of image sets after obtaining a disparity between a P1-RGB image and a P1-IR image, a disparity between a P2-RGB image and a P2-IR image, and a disparity between a P3-RGB image and a P3-IR image by calculating a correlation between the P1-RGB image and the P1-IR image, a correlation between the P2-RGB image and the P2-IR image, and a correlation between the P3-RGB image and the P3-IR image. Thus, the distance determination part may determine a distance between the image sensor 220 and an object by using the disparity between the P1-RGB image and the P1-IR image, which are of the P1 image set (by using the disparity between the P1-RGB image and the P1-IR image based on the mechanism described above in conjunction with FIG. 1).

Additionally, the distance determination part may select a part of a plurality of image sets to use disparities of the part of the image sets and to determine a distance between the image sensor 220 and an object, as well as may select one from the plurality of image sets which is most highly correlated therewith.

For example, the distance determination part may select a part from a plurality of image sets after obtaining disparities of the plurality of image sets by calculating correlations of the plurality of image sets. Next, the distance determination part may apply weight values to distances, which are calculated from disparities of the part of the image sets, to determine a distance between the image sensor 110 and an object.

For more detailed example, the distance determination part may select two image sets, which are respectively changed in disparity sign, from a plurality of image sets (e.g., in the case that a disparity sign of a P1 image set is + and a disparity sign of a P2 image set is −, the P1 image set and the P2 image set are selected) after obtaining disparities of the plurality of image sets by calculating correlations respective to the plurality of image sets. Next, the distance determination part may determine a distance weight average (an average to which weight values are respectively applied to a distance calculated from a disparity of the P1 image set and a distance calculated from a disparity calculated from the P2 image set), which is calculated from disparities of the two image sets changing in disparity sign, as a distance between the image sensor 220 and an object.

As such, a multi-aperture camera system according to an embodiment may more accurately determine a distance between the image sensor 220 and an object by using disparities respective to a plurality of image sets obtained while shifting the unitary optical system 210 to be disposed at a plurality of positions relative to the image sensor 220.

FIG. 3 is a diagram illustrating a first aperture and a second aperture according to an embodiment of the present disclosure.

Referring to FIG. 3, a first aperture 311 and a second aperture 312, according to an embodiment of the present disclosure, may be formed on a unitary optical system and may be offset in at least one of horizontal, vertical, or oblique directions of an image sensor to have different centers each other. For example, the first aperture 311 and the second aperture 312 may be aligned to form agreement between at least one of horizontal, vertical, or oblique directions and a direction of a segment connecting the center of the first aperture 311 with the center of the second aperture 312.

For example, the first aperture 311 may be formed to introduce an RGB optical signal by etching the front (cutting off the RGB optical signal) of a filter 310 included in a unitary optical system and by maintaining the back (cutting off an IR optical signal) of the filter 310. Meanwhile, the second aperture 312 may be formed to introduce an IR optical signal by maintaining the front of the filter 310 and by etching the back of the filter 310. However, embodiments of the present disclosure may not be restrictive hereto and the first aperture 311 and the second aperture 312 may be formed on the filter 310, which is included in a unitary optical system with various types, to respectively introduce an RGB optical signal and an IR optical signal.

Although the first aperture 311 and the second aperture 312 are illustrated as having a shape of circle in the drawings, embodiments of the present disclosure may not be restrictive hereto and may be formed in one of various shapes such as triangle, tetragon, polygon, or a combination of them.

The first aperture 311 and the second aperture 312 may be independently formed without overlay each other on the filter 310 included in a unitary optical system. However, embodiments of the present disclosure may not be restrictive hereto. The first aperture 311 and the second aperture 312 may be partly overlaid each other on the filter 310 included in a unitary optical system, or the second aperture 312 may be formed on the first aperture 311. This configuration will be described later in conjunction with FIGS. 6 to 8.

Additionally, the first aperture 311 and the second aperture 312 may be same in size, or may be differently in various sizes.

Figure 4:
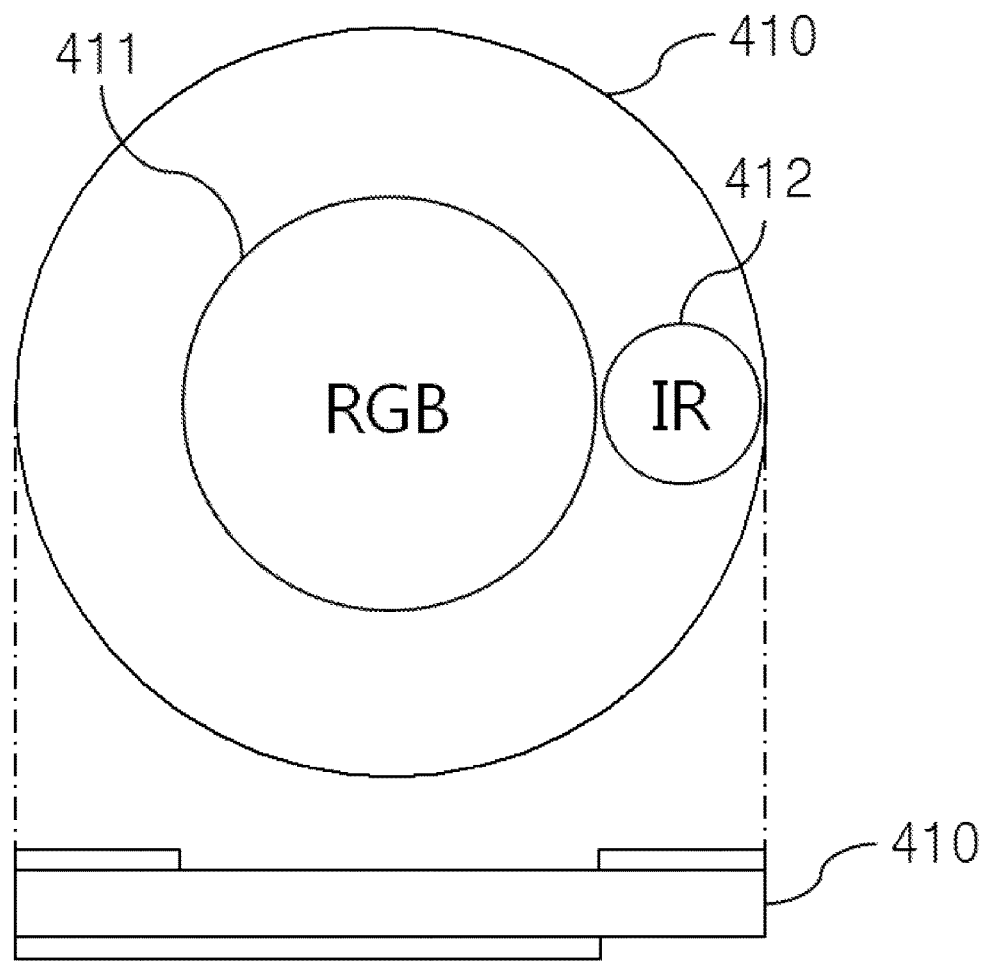
FIG. 4 is a diagram illustrating a first aperture and a second aperture according to another embodiment of the present disclosure.

FIG. 4 is a diagram illustrating a first aperture and a second aperture according to another embodiment of the present disclosure.

Referring to FIG. 4, a first aperture 411 and a second aperture 412, according to another embodiment of the present disclosure, may be formed on a unitary optical system and may be offset in at least one of horizontal, vertical, or oblique directions of an image sensor to have different centers each other. Especially, the first aperture 411 may be even formed to have its center same with that of the unitary optical system in position.

For example, the first aperture 411 introducing an RGB optical signal may be formed to have the same center with a filter 410 included in a unitary optical system, and the second aperture 412 introducing an IR optical signal may be formed to have its center which is different from the center of the filter 410 and the center of the first aperture 411 in position.

The first aperture 411 and the second aperture 412 according to another embodiment may be formed as same as those shown in FIG. 3, except that the first aperture 411 is formed to have the same center with a unitary optical system.

Figure 5:
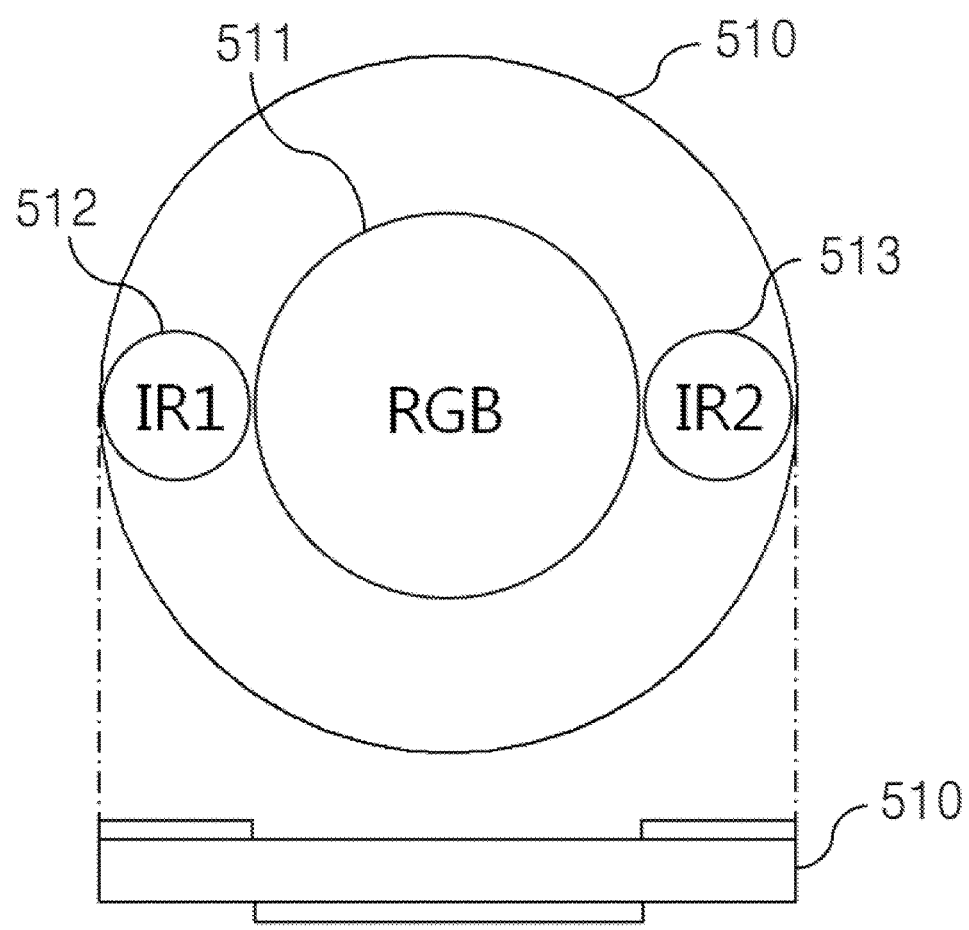
FIG. 5 is a diagram illustrating a first aperture and a second aperture according to still another embodiment of the present disclosure.

FIG. 5 is a diagram illustrating a first aperture and a second aperture according to still another embodiment of the present disclosure.

Referring to FIG. 5, a first aperture 511 and a second aperture 512, according to still another embodiment of the present disclosure, may be formed on a unitary optical system and may be offset in at least one of horizontal, vertical, or oblique directions of an image sensor to have different centers each other. Especially, the second aperture 512 may be formed in plurality.

For example, the first aperture 511 introducing an RGB optical signal may be formed in singularity on a filter 510 included in a unitary optical system, whereas the second apertures 512 and 513 introducing an IR optical signal may be formed in plurality on the filter 510.

Accordingly, a multi-aperture camera system according to still another embodiment may use a plurality of the second apertures 512 and 513 to search a hidden region for an object.

During this, a plurality of the second apertures 512 and 513 may introduce optical signals of different wavelengths (optical signals different from an RGB signal in wavelength). For example, a plurality of the second apertures 512 and 513 may divide a wavelength of an IR optical signal and then may introduce IR optical signals of different wavelengths. Embodiments of the present disclosure may not be restrictive hereto and a plurality of the second apertures 512 and 513 may even introduce optical signals of the same wavelength.

In the case that a plurality of the second apertures 512 and 513 introduce optical signal of the same wavelength, the plurality of the second apertures 512 and 513 may not be symmetrically formed against the first aperture 511 as shown in the drawing but may be asymmetrically formed against the first aperture 511.

A plurality of the second apertures 512 and 513 may be adaptively formed in position and number. This configuration will be described later in conjunction with FIG. 11.

Figure 6:
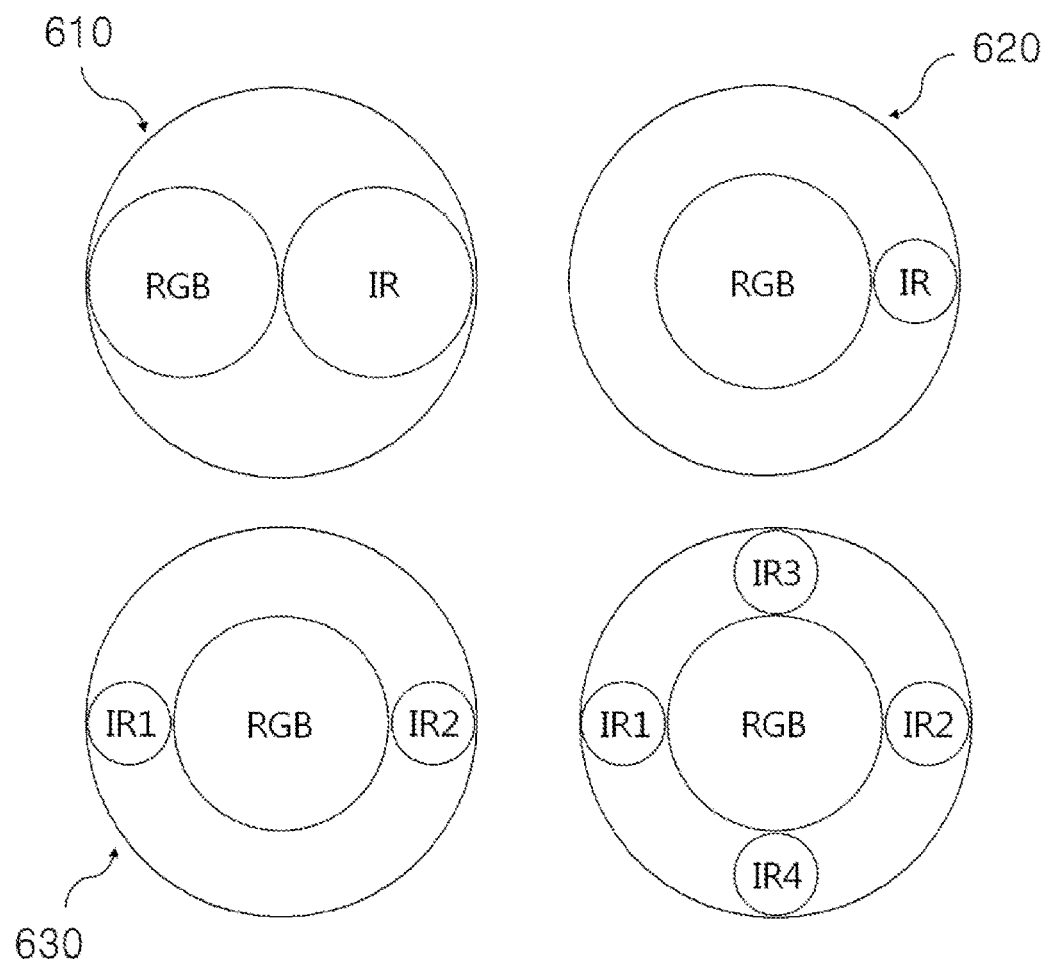
FIGS. 6 to 8 are diagrams illustrating first apertures and second apertures according to various embodiments of the present disclosure.
Figure 7:
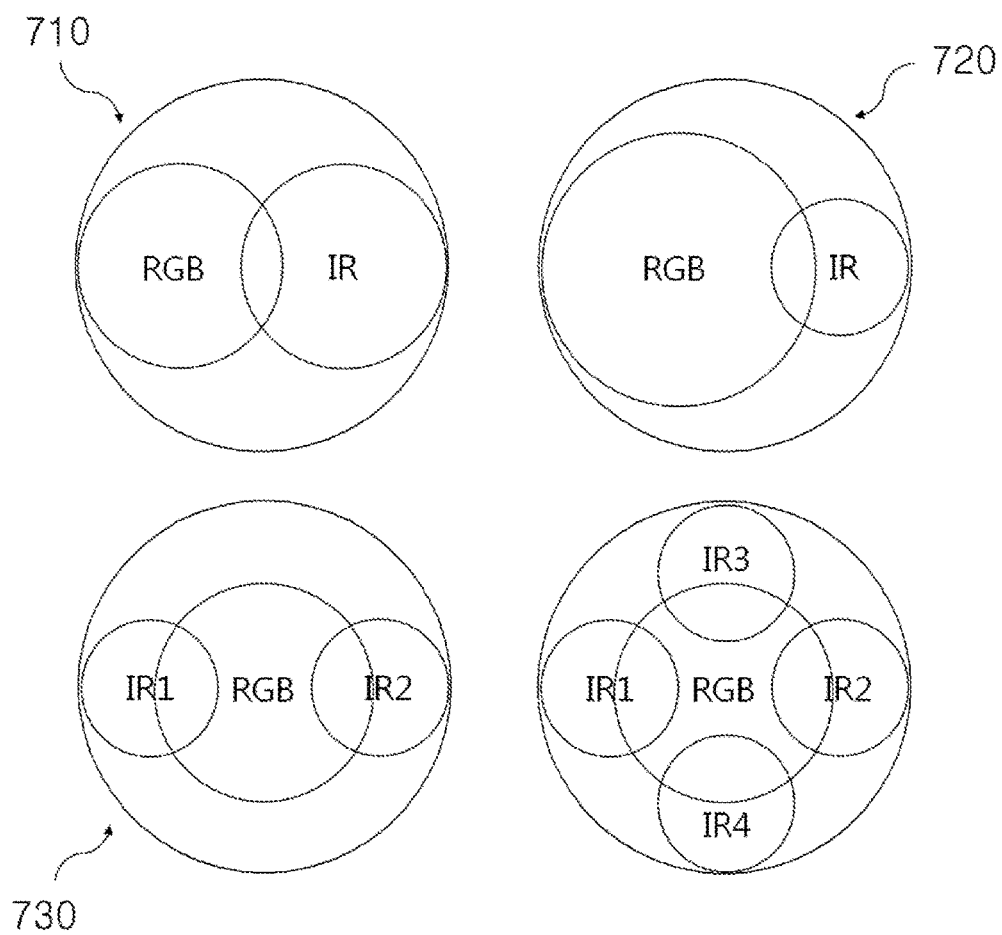
Figure 8:
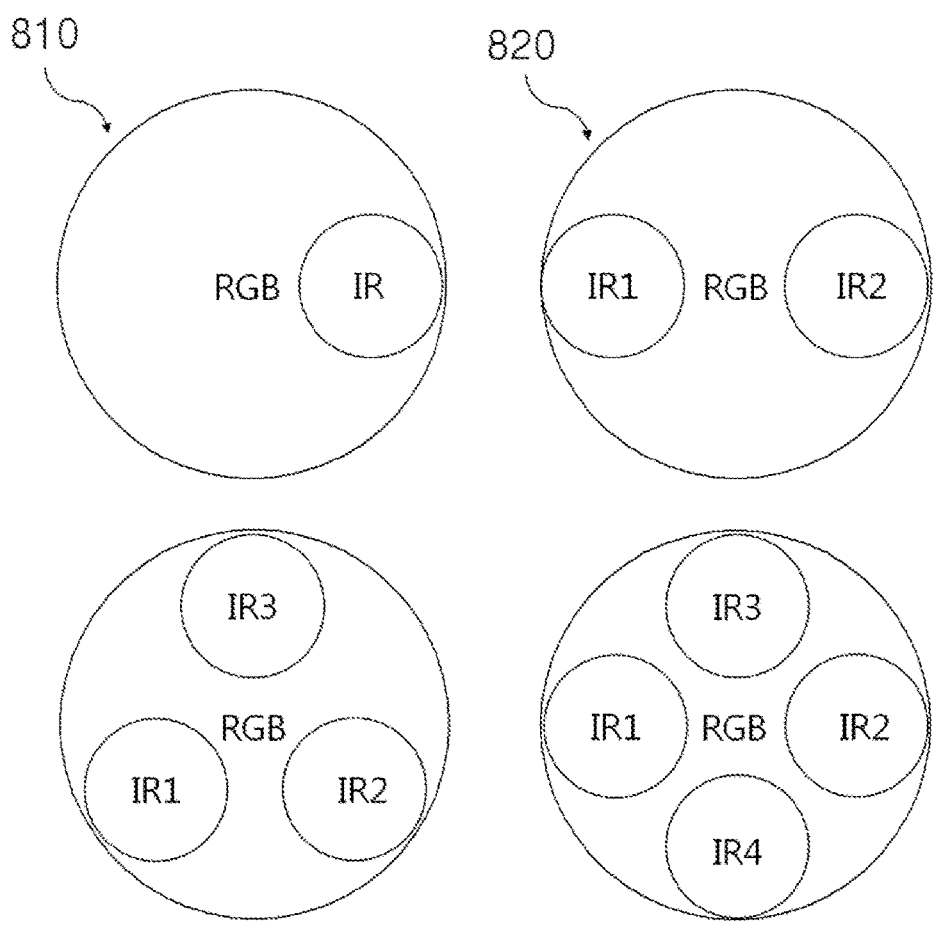

FIGS. 6 to 8 are diagrams illustrating first apertures and second apertures according to various embodiments of the present disclosure.

Referring to FIGS. 6 to 8, a first aperture and a second aperture may be formed on a unitary optical system in various forms, sizes, and structures and may be offset in at least one of horizontal, vertical, or oblique directions of an image sensor to have different centers each other.

For example, a first aperture and a second aperture, which are included in a multi-aperture camera system, may be formed in the same size without overlap between them like pattern 610. Otherwise, like pattern 620, a first aperture may be formed larger than a second aperture and may be formed independent from the second aperture without overlap between them. Additionally, a first aperture and a second aperture, which are included in a multi-aperture camera system, may be independently formed each other in singularity and plurality, respectively, without overlap between them as shown by pattern 630.

For another example, a first aperture and a second aperture, which are included in a multi-aperture camera system, may be formed in the same size with at least overlap in part between them like pattern 710. Otherwise, like pattern 720, a first aperture may be formed larger than a second aperture with at least overlap in part between them. Additionally, a first aperture and a second aperture, which are included in a multi-aperture camera system, may be formed in singularity and plurality, respectively, with at least overlap in part between them as shown by pattern 730.

For still another example, a second aperture included in a multi-aperture camera system may be formed in a first aperture like pattern 810, or may be formed in plurality in a single first aperture like pattern 820.

Although those patterns, a first aperture and a second aperture may not be restrictive thereto in configuration and may be formed in various patterns, sizes, and structures.

Figure 9:
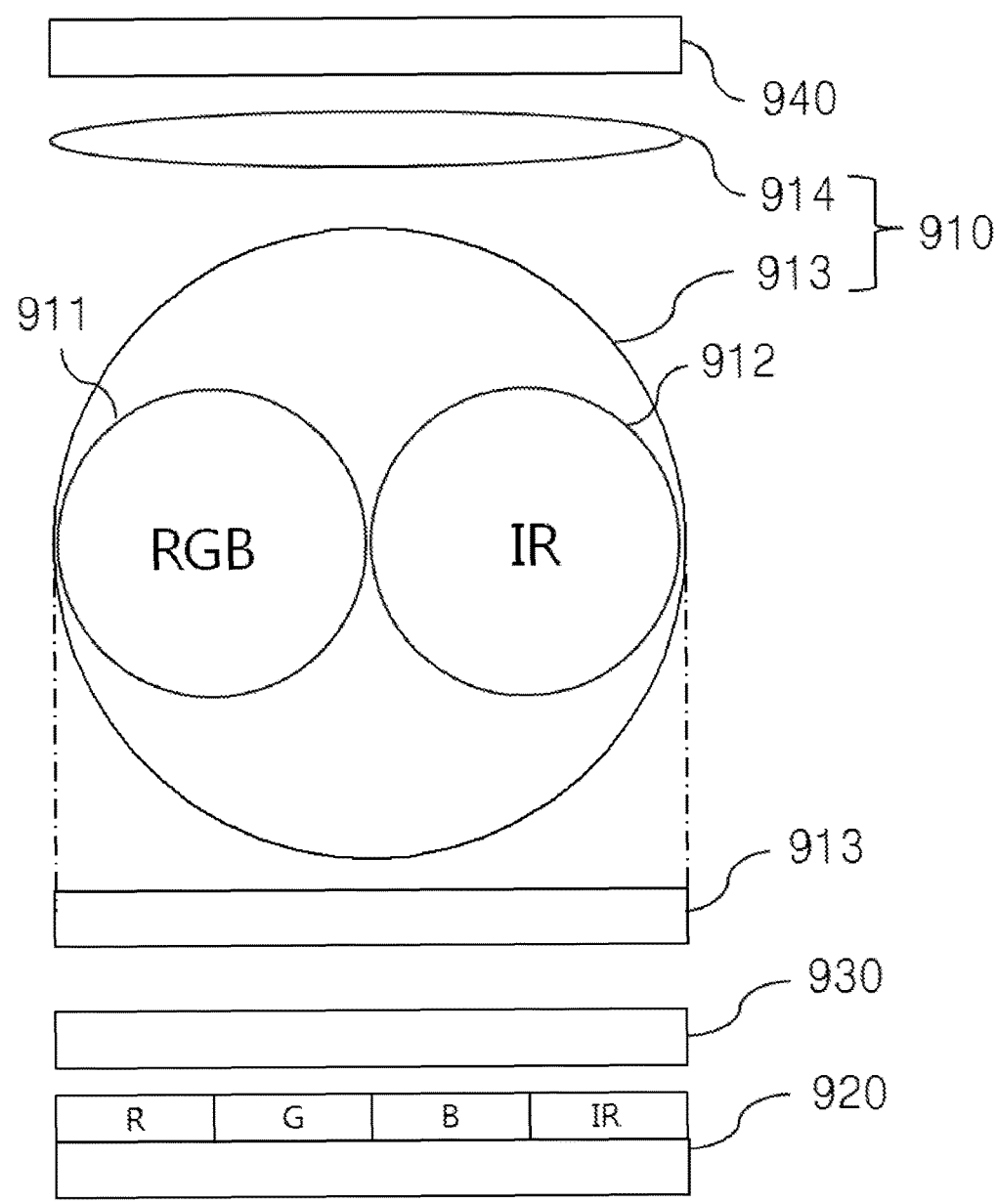
FIG. 9 is a diagram illustrating a multi-aperture camera system according to another embodiment of the present disclosure.

FIG. 9 is a diagram illustrating a multi-aperture camera system according to another embodiment of the present disclosure.

Referring to FIG. 9, a multi-aperture camera system according to another embodiment may include a unitary optical system 910, an image sensor 920, and a distance determining part (not shown). Although the multi-aperture camera system of FIG. 9 illustrated as including the unitary optical system 910, the image sensor 920, and the distance determining part, as same with the function of the multi-aperture camera system shown in FIG. 2, the multi-aperture camera system of FIG. 9 may further include an Selective IR Filter (SIR) filter 930 and a dual band filter 940.

The SIR filter 930 may prevent an IR optical signal from being introduced into an RGB pixel (IR leakage) included in the image sensor 920 (the RGB pixel processes an RGB optical signal for obtaining a first image).

As also, the dual band filter 940 may be disposed over a first aperture 911 and a second aperture 912 (over or under a lens 914 included in the unitary optical system 910) which are formed on a filter 913 included in the unitary optical system 910, selectively introducing an RGB optical signal or an IR optical signal, and may prevent the IR optical signal from being introduced into an RGB pixel. For example, the dual band filter may selectively introduce only an RGB optical signal in the case that the image sensor 920 needs to process the RGB optical signal which is introduce through the first aperture 911 (in the case that an RGB pixel included in the image sensor 920 is to operate). The dual band filter may selectively introduce only an IR optical signal in the case that the image sensor 920 needs to process the IR optical signal which is introduced through the second aperture 912 (in the case that an IR pixel included in the image sensor 920 is to operate).

The multi-aperture camera system shown in FIG. 9 is illustrated as including both the SIR filter 930 and the dual band filter 940, embodiments of the present disclosure may not restrictive hereto and one of the SIR filter 930 and the dual band filter 940 may be selectively included in the multi-aperture camera system of FIG. 9.

Figure 10:
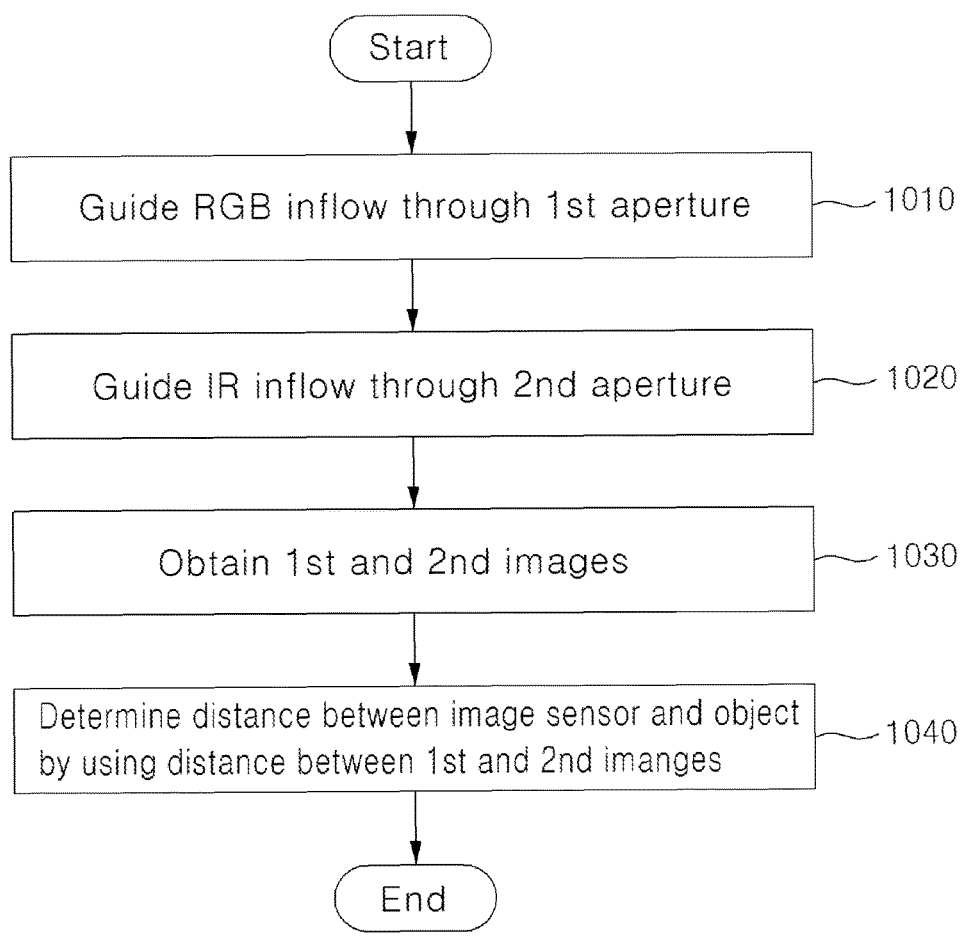
FIG. 10 is a flow chart an operating method of a multi-aperture camera system according to an embodiment of the present disclosure.

FIG. 10 is a flow chart an operating method of a multi-aperture camera system according to an embodiment of the present disclosure.

Referring to FIG. 10, a multi-aperture camera system may introduce an RGB optical signal through a first aperture (step 1010).

Subsequently, the multi-aperture camera system may introduce an IR optical signal through a second aperture different from the first aperture (step 1020).

Although not shown, before the steps 1010 and 1020, the multi-aperture camera system may use a dual band filter, which is disposed over the first aperture and the second aperture, to selectively introduce one of an RGB optical signal and an IR optical signal. A process of introducing one of an RGB optical signal and an IR optical signal through a dual band filter may not be even selectively performed.

The first aperture and the second aperture may be formed on a unitary optical system and may be offset in at least one of horizontal, vertical, or oblique directions of an image sensor to have different centers each other. For example, the first aperture and the second aperture may be aligned to form agreement between at least one of horizontal, vertical, oblique directions of an image sensor and a direction of a segment connecting the center of the first aperture with the center of the second aperture.

The first aperture may be even formed to have the same center with a unitary optical system in position.

Additionally, the first aperture and the second aperture may be shaped in one of a circle, an oval, a triangle, a tetragon, a polygon, or a combination of them.

Additionally, the second aperture may be formed in plurality to search a hidden region for an object. In this case, a plurality of the second apertures may introduce optical signals of different wavelengths.

Then, the multi-aperture camera system may process the RGB optical signal, which is introduced by the first aperture, and the IR optical signal, which is introduced by the second aperture, through the image sensor, and may obtain a first image and a second image for an object (step 1030). For example, the multi-aperture camera system may obtain a first image for an object from an RGB optical signal, which is introduced by the first aperture, through an image sensor, and may obtain a second image for an object from an IR optical signal, which is introduced by the second aperture, through an image sensor.

Although not shown, at the step 1030, the multi-aperture camera system may use an SIR filter to prevent introduction of an IR optical signal into an RGB pixel included in an image sensor.

Next, the multi-aperture camera system may use a disparity between the first image and the second image to determine a distance between an image sensor and an object through a distance determining part (step 1040).

In detail, the multi-aperture camera system may calculate a distance from an object to a unitary optical system, in which the first aperture and the second aperture are formed, based on a disparity between a first image and a second image, a distance between the center of the first aperture and the center of the second aperture, an object distance focused on an image sensor, and a focal length. Accordingly, the multi-aperture camera system may sum up a distance from an object to a unitary optical system and a distance between an image sensor and the unitary optical system to determine a distance from the image sensor to the object.

Additionally, the multi-aperture camera system may calculate a distance between an image sensor and an object by using a blur size of each of a first image and a second image, as well as by using a disparity between the first image and the second image.

Figure 11:
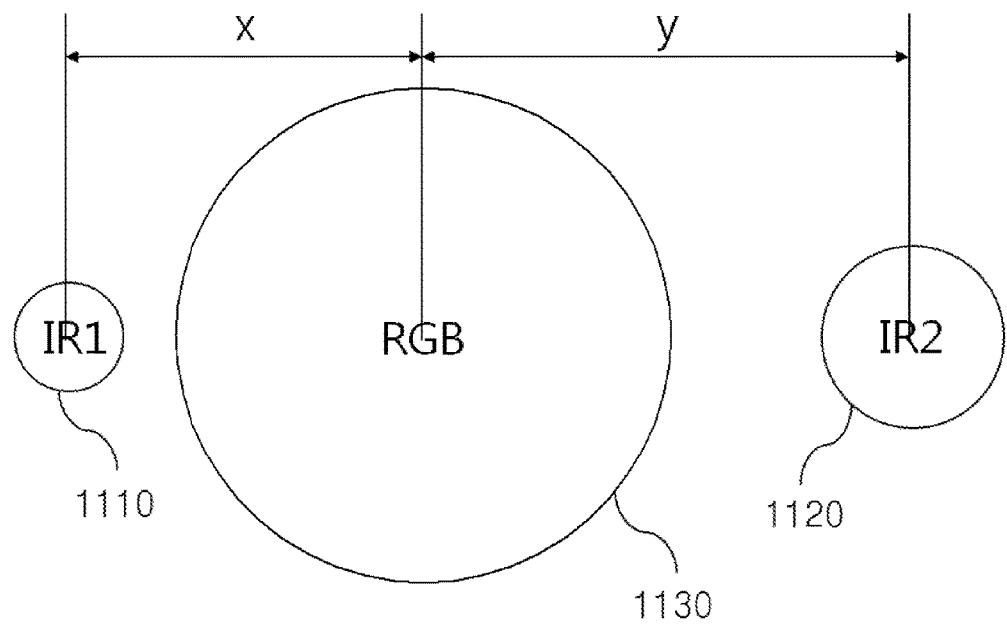
FIG. 11 is a diagram illustrating a plurality of second apertures asymmetrically formed to a first aperture according to an embodiment of the present disclosure.

FIG. 11 is a diagram illustrating a plurality of second apertures asymmetrically formed to a first aperture according to an embodiment of the present disclosure.

Referring to FIG. 11, a plurality of second apertures 1110 and 1120 may be formed asymmetrically to a first aperture 1130. For example, one of the plurality of the second apertures 1110 and 1120 (e.g., 1110) may be formed to have its center distant by x from the center of the first aperture 1130 and the other of the plurality of the second apertures 1110 and 1120 (e.g., 1120) may be formed to have its center distant by y from the center of the first aperture 1130.

Additionally, as one second aperture 1110 is formed smaller than the other second aperture 1120 in size, the plurality of the second apertures 1110 and 1120 may be asymmetrically formed in different sizes.

The multi-aperture camera system may use second images, which are obtained respectively through the plurality of the second apertures 1110 and 1120, to calculate a correlation to a first image obtained through the first aperture 1130. Accordingly, it may be allowable to eliminate ambiguity between the second images obtained respectively through the plurality of the second apertures 1110 and 1120.

As described above, since the multi-aperture camera system of FIG. 11 according to an embodiment may include the plurality of the second apertures 1110 and 1120 which are asymmetrically formed to the first aperture 1130, it may be useful for eliminating ambiguity by using images obtained respectively through the plurality of the second apertures, as well as available for searching a hidden region for an object.

While embodiments of the present disclosure have been shown and described with reference to the accompanying drawings thereof, it will be understood by those skilled in the art that various changes and modifications in form and details may be made therein without departing from the spirit and scope of the present disclosure as defined by the appended claims and their equivalents. For example, it may be allowable to achieve desired results although the embodiments of the present disclosure are preformed in other sequences different from the descriptions, and/or the elements, such as system, structure, device, circuit, and so on, are combined or assembled in other ways different from the descriptions, replaced or substituted with other elements or their equivalents.

Therefore, other implementations, other embodiments, and equivalents of the appended claims may be included in the scope of the appended claims.

What is claimed is:

1. A multi-aperture camera system using a disparity, the multi-aperture camera system comprising:
    a first aperture configured to introduce an RGB optical signal;
    a second aperture distinguished from the first aperture and configured to introduce an infrared ray (IR) optical signal that is different from the RGB optical signal in wavelength;
    an image sensor configured to process the RGB optical signal introduced through the first aperture to obtain a first image of an object and configured to process the IR optical signal introduced through the second aperture to obtain a second image of the object; and a distance determining part configured to use the disparity between the first image and the second image to determine a distance between the image sensor and the object, wherein the first aperture and the second aperture are formed on a unitary optical system to have different centers from each other, and wherein the distance determining part calculates the distance from the object to the unitary optical system in which the first aperture and the second aperture are formed, based on the disparity between the first image and the second image, a distance between the center of the first aperture and the center of the second aperture, an object distance focused on the image sensor, and a focal length.

2. The multi-aperture camera system claim 1, wherein the first aperture and the second aperture are formed to have centers that are offset in at least one of horizontal, vertical, or oblique directions of the image sensor.

3. The multi-aperture camera system claim 1, wherein the first aperture and the second aperture are shaped in one of a circle, an oval, a triangle, a tetragon, a polygon, or a combination.

4. The multi-aperture camera system claim 1, wherein the second aperture is configured in plurality to search a hidden region for the object.

5. The multi-aperture camera system claim 4, wherein the plurality of the second apertures introduces IR optical signals of different wavelengths.

6. The multi-aperture camera system claim 1, wherein the first aperture is formed to have the same center with the unitary optical system.

7. The multi-aperture camera system claim 1, further comprising:
a selective IR (SIR) filter configured to prevent introduction of an optical signal into a RGB pixel that is included in the image sensor and processes the RGB optical signal for the first image.

8. The multi-aperture camera system claim 1, further comprising:
a dual band filter disposed over the first aperture and the second aperture and configured to selectively introduce one of the RGB optical signal and an optical signal for preventing introduction of the optical signal, which is different from the RGB optical signal in wavelength, into a RGB pixel that is included in the image sensor and processes the RGB optical signal for the first image.

9. The multi-aperture camera system claim 1, wherein the first aperture and the second aperture are independently formed without overlap each other on the unitary optical system.

10. The multi-aperture camera system claim 1, wherein the first aperture and the second aperture are partly overlaid each other on the unitary optical system.

11. The multi-aperture camera system claim 1, wherein the second aperture is formed in the first aperture.

12. A multi-aperture camera system using a disparity, the multi-aperture camera system comprising:
a first aperture configured to introduce an RGB optical signal;
a second aperture distinguished from the first aperture and configured to introduce an infrared ray (IR) optical signal that is different from the RGB optical signal in wavelength;
an image sensor configured to process the RGB optical signal, which is introduced through the first aperture, and to obtain a first image to an object and configured to process the IR optical signal, which is introduced through the second aperture, and to obtain a second image for the object; and
a distance determining part configured to use a disparity between the first image and the second image and to determine a distance between the image sensor and the object, wherein the first aperture and the second aperture are formed on a unitary optical system to have different centers each other, and wherein the distance determination part searches a plurality of object target regions from the second image by a searching range based on a source region for the object in the first image, selects one of the plurality of target regions by calculating a correlation between the source region and each of the plurality of target regions, and determines a distance between the image sensor and the object by using a disparity between the source region and the selected one of the target regions.

13. The multi-aperture camera system of claim 12, wherein the distance determination part converts heights and widths of the source region and the plurality target regions into a plurality of values, and searches the plurality of target regions from the second image by the searching range based on the source region.

14. An operating method for a multi-aperture camera system using a disparity, the operating method comprising:
introducing an RGB optical signal through a first aperture;
introducing an optical signal, which is different from the RGB optical signal in wavelength, through a second aperture distinguished from the first aperture;
processing the RGB optical signal, which is introduced through the first aperture, and an IR optical signal, which is introduced through the second aperture by an image sensor and obtaining a first image and a second image for an object; and
using a disparity between the first image and the second image and determining a distance between the image sensor and the object, wherein the first aperture and the second aperture are formed on a unitary optical system to have different centers from each other, and wherein the determining the distance between the image sensor and the object comprises calculating the distance from the object to the unitary optical system, in which the first aperture and the second aperture are formed, based on the disparity between the first image and the second image, a distance between the center of the first aperture and the center of the second aperture, an object distance focused on the image sensor, and a focal length.

15. A multi-aperture camera system using a disparity, the multi-aperture camera system comprising:
a unitary optical system equipped with a first aperture introducing an RGB optical signal, and a second aperture introducing an IR optical signal, and configured to shift to be disposed at a plurality of positions;
an image sensor configured to obtain a plurality of image sets—each image set including a first image obtained by processing the RGB optical signal which is introduced through the first aperture, and a second image obtained by processing the IR optical signal—in correspondence with the plurality of positions in response to disposition of the unitary optical system at the plurality of positions; and a distance determination part configured to determine a distance between the image sensor and an object by a disparity of each of the plurality of image sets, wherein the first aperture and the second aperture are formed to have center positions crossing each other on the unitary optical system.

16. The multi-aperture camera system of claim 15, wherein the distance determination part calculates a correlation of each of the plurality of image sets, and may determine a distance to the image sensor and the object by using a disparity of at least one of the plurality of image sets based on the correlation of the each of the plurality of image sets.

\* \* \* \* \*